United States Patent
Gane et al.

(10) Patent No.: US 9,394,428 B2
(45) Date of Patent: Jul. 19, 2016

(54) DISPERSED CALCIUM CARBONATE CONTAINING MATERIAL FOR AN IMPROVED STABILITY UNDER ALKALINE CONDITIONS

(71) Applicant: Omya International AG, Oftringen (CH)

(72) Inventors: Patrick A. C. Gane, Rothrist (CH); Daniel Gantenbein, Elnesvagen (NO)

(73) Assignee: Omya International AG, Oftringen (CH)

( * ) Notice: Subject to any disclaimer, the term of this patent is extended or adjusted under 35 U.S.C. 154(b) by 86 days.

(21) Appl. No.: 14/381,801

(22) PCT Filed: Mar. 26, 2013

(86) PCT No.: PCT/EP2013/056390
§ 371 (c)(1),
(2) Date: Aug. 28, 2014

(87) PCT Pub. No.: WO2013/144137
PCT Pub. Date: Oct. 3, 2013

(65) Prior Publication Data
US 2015/0040800 A1    Feb. 12, 2015

Related U.S. Application Data

(60) Provisional application No. 61/618,883, filed on Apr. 2, 2012.

(30) Foreign Application Priority Data

Mar. 30, 2012  (EP) .................................... 12162765

(51) Int. Cl.
| | | |
|---|---|---|
| C08K 3/26 | (2006.01) | |
| C08K 5/5317 | (2006.01) | |
| C01F 11/18 | (2006.01) | |
| C09C 1/02 | (2006.01) | |
| D21H 19/38 | (2006.01) | |
| D21H 17/63 | (2006.01) | |
| D21H 17/64 | (2006.01) | |
| D21H 17/66 | (2006.01) | |
| D21H 17/10 | (2006.01) | |

(52) U.S. Cl.
CPC ............. *C08K 5/5317* (2013.01); *C01F 11/185* (2013.01); *C08K 3/26* (2013.01); *C09C 1/021* (2013.01); *D21H 17/10* (2013.01); *D21H 17/63* (2013.01); *D21H 17/64* (2013.01); *D21H 17/66* (2013.01); *D21H 19/385* (2013.01); *C01P 2004/51* (2013.01); *C01P 2004/61* (2013.01); *C01P 2006/22* (2013.01); *C08K 2003/265* (2013.01)

(58) Field of Classification Search
CPC ........ C08K 3/26; C08K 5/5317; C01F 11/185
See application file for complete search history.

(56) References Cited

U.S. PATENT DOCUMENTS

| | | |
|---|---|---|
| 5,145,902 A | 9/1992 | Ravet et al. |
| 5,783,038 A | 7/1998 | Donigian et al. |

FOREIGN PATENT DOCUMENTS

| | | |
|---|---|---|
| EP | 1151966 A1 | 11/2001 |
| WO | 9829601 A2 | 7/1998 |
| WO | 20090007072 A1 | 1/2009 |
| WO | 2012013349 A2 | 2/2012 |

OTHER PUBLICATIONS

International Search Report dated Jun. 8, 2013 for PCT Application No. PCT/EP2013/056390.
Written Opinion of the International Searching Authority dated Jun. 8, 2013 for PCT Application No. PCT/EP2013/056390.

*Primary Examiner* — Pegah Parvini
(74) *Attorney, Agent, or Firm* — Amster, Rothstein & Ebenstein LLP

(57) ABSTRACT

The present invention relates to a method for preparing an aqueous calcium carbonate containing suspension, a suspension comprising a calcium carbonate containing material obtainable by said method as well as a calcium carbonate containing material obtainable by drying said suspension and to the use of the suspension or calcium carbonate containing material in paper, paper coating, plastic and/or paint applications and to the use of the suspension for stabilizing the rheology of a sodium silicate and/or sodium hydroxide containing coating formulations for paper applications.

42 Claims, No Drawings

DISPERSED CALCIUM CARBONATE CONTAINING MATERIAL FOR AN IMPROVED STABILITY UNDER ALKALINE CONDITIONS

CROSS-REFERENCE TO RELATED APPLICATIONS

This application is a U.S. national phase of PCT Application No. PCT/EP2013/056390, filed Mar. 26, 2013, which claims priority to European Application No. 1262765.7, filed Mar. 30, 2012 and U.S. Provisional Application No. 61/618,883, filed Apr. 2, 2012.

The present invention relates to a method for preparing an aqueous calcium carbonate containing suspension, a suspension comprising a calcium carbonate containing material obtainable by said method as well as a calcium carbonate containing material obtainable by drying said suspension and to the use of the suspension or calcium carbonate containing material in paper, paper coating, plastic and/or paint applications and to the use of the suspension for stabilizing the rheology of a sodium silicate and/or sodium hydroxide containing coating formulations for paper applications.

Mineral materials and binders are among the main constituents used in the manufacture of numerous products such as paints, paper and plastic materials. Therein, mineral materials such as calcium carbonate and other particulate materials contribute mechanical and optical properties, while the binder, generally latex-based and in the form of aqueous suspensions or dispersions, provide the necessary adhesion and cohesion for the respective constituents of the end product to be produced.

One problem in this regard resides in the fact that latex-based binders are made from fossil resources such as crude oil or similar sources and are thus non-renewable. Furthermore, latex-based binders typically provide a rather low degradability and thus their use e.g. in paper coating formulations leads to increasing environmental concerns.

In the art, several approaches for the reduction of latex-based binders in calcium carbonate containing suspensions that may be used as coating formulations in paper applications have been proposed. For instance, one approach involves the addition of sodium silicate for reducing the binder level in such coating formulations. In this regard, reference is e.g. made to EP 2 167 324 B1 referring to a printing sheet for offset printing, comprising at least one image receiving coating and optionally one or several pre-coatings beneath said image receiving coating, said coatings comprising a pigment part, a binder part, and optionally additives, wherein the pigment part essentially consists of one or a mixture of fine particulate pigments selected from the group of carbonate, kaolin, solid or vacuolated polymer pigment, wherein said binder part comprises waterglass.

However, the described calcium carbonate containing suspensions and methods for preparing such suspensions have the disadvantage that, due to the addition of water glass, the obtained suspensions have an increased pH and, furthermore, comprise a high concentration of sodium ions leading to a time-dependent instability in rheology, i.e. the Brookfield viscosity of the calcium carbonate containing suspension increases dramatically over time. As a consequence of the viscosity increase, the prepared calcium carbonate containing suspensions are useless as coating color formulations in paper applications.

Thus, there is a continuous need for improving methods for the preparation of a calcium carbonate containing suspension which addresses the foregoing technical problems described and especially allows for stabilizing the rheology of such compositions in the presence of sodium silicate and/or sodium hydroxide.

Accordingly, it is an objective of the present invention to provide a method for preparing a calcium carbonate containing suspension having at least a reduced content of latex-based binder. A further objective is to provide a method for preparing a calcium carbonate containing suspension such that the obtained paper coating formulation features a rheology that is stable over time. Even a further objective is to provide a method for preparing a calcium carbonate containing suspension such that the obtained paper coating formulation features a rheology that is stable over time in the presence of sodium silicate and/or sodium hydroxide. A still further objective is to provide a method for preparing a calcium carbonate containing suspension that can be carried out under cost-efficient conditions, i.e. by reducing the content of or avoiding the use of cost-intensive raw materials based on fossil resources. Further objectives can be gathered from the following description of the invention.

The foregoing and other objects are solved by the subject-matter as defined herein in the present invention.

According to a first aspect of the present invention, a method for preparing an aqueous calcium carbonate containing suspension is provided, wherein the method comprises the following steps of:
  a) providing a calcium carbonate containing material in the form of an aqueous cake or suspension having solids content of at least 45 wt.-%, based on the total weight of the aqueous cake or suspension;
  b) providing at least one alkali metal salt of a phosphonic acid in an amount from 0.01 to 5 wt.-%, based on the total dry weight of the calcium carbonate containing material;
  c) providing at least one phosphonic acid in an amount from 0.001 to 0.5 wt.-%, based on the total dry weight of the calcium carbonate containing material;
  d) contacting the calcium carbonate containing material of step a) with the at least one alkali metal salt of a phosphonic acid of step b) such as to obtain a suspension having a pH from 10 to 14;
  e) contacting the suspension of step d) with the at least one phosphonic acid of step c) such as to obtain a suspension having a pH from 8 to 10; and
  f) optionally grinding the suspension obtained in step e).

The inventors surprisingly found that the foregoing method according to the present invention leads to calcium carbonate containing suspensions providing no latex-based binder, i.e. thus avoids the use of cost-intensive raw materials based on fossil resources, as well as a stable rheology over time and a stable rheology over time in the presence of sodium silicate and/or sodium hydroxide. More precisely, the inventors found that the properties of a calcium carbonate containing suspension can be improved by the subsequent addition of a defined alkali metal salt of a phosphonic acid and a defined phosphonic acid at defined pHs to such a suspension.

It should be understood that for the purposes of the present invention, the following terms have the following meaning:

For the purpose of the present invention, the term "calcium carbonate containing material" refers to a material that comprises at least 50 wt.-% calcium carbonate, based on the total dry weight of the calcium carbonate containing material. The term "calcium carbonate" in the meaning of the present invention refers to ground or natural calcium carbonate (GCC), and/or synthetic or precipitated calcium carbonate (PCC) and/or modified calcium carbonate (MCC).

The term calcium carbonate containing "suspension" in the meaning of the present invention comprises insoluble solids and water and optionally further additives and usually contains large amounts of solids and, thus, is more viscous and generally of higher density than the liquid from which it is formed.

The term "acid" shall be understood to represent acids in accordance with the Bronsted acid-base theory; that is to say, an acid is a proton donor leading to a pH decrease when dissolved in water.

The term "dry" is understood to be a calcium carbonate containing material having less than 0.3% by weight of water relative to the weight of the calcium carbonate containing material. The % water is determined according to the Coulometric Karl Fischer measurement method, wherein the calcium carbonate containing material is heated to 220° C., and the water content released as vapour and isolated using a stream of nitrogen gas (at 100 ml/min) is determined in a Coulometric Karl Fischer unit.

A further aspect of the present invention refers to a suspension comprising a calcium carbonate containing material obtainable by the method. A still further aspect refers to a calcium carbonate containing material obtainable by drying the suspension. Another aspect of the present invention is directed to the use of the suspension or calcium carbonate containing material in paper, paper coating, plastic and/or paint applications. A further aspect of the present invention is directed to the use of the suspension for stabilizing the rheology of a coating formulation for paper applications, wherein the coating formulation comprises sodium silicate and/or sodium hydroxide.

Advantageous embodiments of the present invention are defined in the corresponding sub-claims.

When in the following reference is made to preferred embodiments or technical details of the inventive method for preparing an aqueous calcium carbonate containing suspension, it is to be understood that these preferred embodiments or technical details also refer to the inventive suspension, the inventive calcium carbonate containing material and uses as defined herein and vice versa (as far as applicable). If, for example, it is set out that the calcium carbonate containing material of the inventive method is a ground calcium carbonate, a precipitated calcium carbonate, a modified calcium carbonate or a mixture thereof also the calcium carbonate containing material of the inventive suspension, the inventive calcium carbonate containing material and uses is a ground calcium carbonate, a precipitated calcium carbonate, a modified calcium carbonate or a mixture thereof.

The present invention will be described with respect to particular embodiments and with reference to certain figures but the invention is not limited thereto but only by the claims. Terms as set forth hereinafter are generally to be understood in their common sense unless indicated otherwise.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to one embodiment of the present invention, the calcium carbonate containing material of step a) is a ground calcium carbonate, a precipitated calcium carbonate, a modified calcium carbonate or a mixture thereof.

According to another embodiment of the present invention, the cake or suspension of step a) has solids content from 50 to 98 wt.-%, preferably from 60 to 90 wt.-% and more preferably from 70 to 85 wt.-%, based on the total weight of the aqueous cake or suspension.

According to yet another embodiment of the present invention, the calcium carbonate containing material of step a) has a weight median particle size $d_{50}$ from 1 to 100 µm, preferably from 1 to 70 µm, more preferably from 1 to 50 µm, even more preferably from 1 to 25 µm and most preferably from 1 to 10 µm.

According to one embodiment of the present invention, the alkali metal of the at least one alkali metal salt of a phosphonic acid of step b) is selected from the group consisting of sodium, potassium, lithium and mixtures thereof, preferably the alkali metal of the at least one alkali metal salt of a phosphonic acid of step b) is sodium.

According to another embodiment of the present invention, the at least one alkali metal salt of a phosphonic acid of step b) is selected from an alkali metal salt of a diphosphonic acid and an alkali metal salt of a triphosphonic acid, preferably the at least one alkali metal salt of a phosphonic acid is an alkali metal salt of a diphosphonic acid.

According to yet another embodiment of the present invention, the at least one alkali metal salt of a phosphonic acid of step b) is an alkali metal salt of a diphosphonic acid selected from 1-hydroxyethane 1,1-diphosphonic acid (HEDP), methylene diphosphonic acid (MDP), hydroxymethylene diphosphonic acid (HMDP), hydroxycyclomethylene diphosphonic acid (HCMDP) and 1-hydroxy-3-aminopropane-1,1-diphosphonic acid (APD), preferably 1-hydroxyethane 1,1-diphosphonic acid (HEDP).

According to one embodiment of the present invention, the alkali metal salt of a diphosphonic acid of step b) is selected from tetrasodium (1-hydroxyethylidene)bisphosphonate ($Na_4HEDP$), trisodium (1-hydroxyethylidene)bisphosphonate ($Na_3HEDP$), disodium (1-hydroxyethylidene)bisphosphonate ($Na_2HEDP$), tetrapotassium (1-hydroxyethylidene)bisphosphonate ($K_4HEDP$), tripotassium (1-hydroxyethylidene)bisphosphonate ($K_3HEDP$) and dipotassium (1-hydroxyethylidene)bisphosphonate ($K_2HEDP$), preferably the alkali metal salt of a diphosphonic acid of step b) is tetrasodium (1-hydroxyethylidene)bisphosphonate ($Na_4HEDP$).

According to another embodiment of the present invention, the at least one alkali metal salt of a phosphonic acid of step b) is in form of an aqueous solution, preferably an aqueous solution comprising the at least one alkali metal salt of a phosphonic acid in an amount from 10 to 80 wt.-%, preferably from 20 to 66 wt.-% and most preferably from 30 to 50 wt.-%, based on the total weight of the solution.

According to yet another embodiment of the present invention, the at least one phosphonic acid of step c) is selected from a diphosphonic acid and triphosphonic acid, preferably the at least one phosphonic acid of step c) is a diphosphonic acid.

According to one embodiment of the present invention, the at least one phosphonic acid of step c) is a diphosphonic acid selected from 1-hydroxyethane 1,1-diphosphonic acid (HEDP), methylene diphosphonic acid (MDP), hydroxymethylene diphosphonic acid (HMDP), hydroxycyclomethylene diphosphonic acid (HCMDP) and 1-hydroxy-3-aminopropane-1,1-diphosphonic acid (APD), preferably the at least one phosphonic acid of step c) is 1-hydroxyethane 1,1-diphosphonic acid (HEDP).

According to another embodiment of the present invention, the at least one phosphonic acid of step c) is in form of an aqueous solution, preferably an aqueous solution comprising the at least one phosphonic acid in an amount from 25 to 75 wt.-%, preferably from 35 to 65 wt.-% and most preferably from 45 to 60 wt.-%, based on the total weight of the solution.

According to yet another embodiment of the present invention, the at least one alkali metal salt of a phosphonic acid of step b) is a sodium salt of 1-hydroxyethane 1,1-diphosphonic acid ($Na_4HEDP$) and the at least one phosphonic acid of step c) is 1-hydroxyethane 1,1-diphosphonic acid (HEDP).

According to one embodiment of the present invention, step d) is carried out in that the at least one alkali metal salt of a phosphonic acid of step b) is added to the calcium carbonate containing material of step a) in an amount from 0.05 to 2.5 wt.-%, preferably in an amount from 0.05 to 1.5 wt.-%, more preferably in an amount from 0.05 to 1 wt.-% and most preferably in an amount from 0.1 to 1 wt.-%, based on the total dry weight of the calcium carbonate containing material.

According to another embodiment of the present invention, the suspension obtained in step d) has a pH of from 9 to 12, preferably from 10 to 12 and most preferably around 11.

According to yet another embodiment of the present invention, the suspension obtained in step d) is diluted with water to solids content of from 40 to 90 wt.-%, preferably from 50 to 80 wt.-% and more preferably from 60 to 75 wt.-%, based on the total weight of the suspension.

According to one embodiment of the present invention, the suspension obtained in step d) has solids content of from 50 to 88 wt.-%, preferably from 55 to 88 wt.-%, more preferably from 65 to 86 wt.-%, even more preferably from 68 to 84 wt.-% and most preferably from 72 to 82 wt.-%, based on the total weight of the suspension.

According to another embodiment of the present invention, the suspension obtained in step d) has a Brookfield viscosity from 50 to 5000 mPa·s at 23° C., preferably from 60 to 3000 mPa·s at 23° C., more preferably from 100 to 1000 mPa·s at 23° C. and most preferably from 150 to 900 mPa·s at 23° C.

According to yet another embodiment of the present invention, step e) is carried out in that the at least one phosphonic acid of step c) is added to the suspension obtained in step d) in an amount from 0.01 and 0.5 wt.-%, preferably in an amount from 0.05 to 0.4 wt.-%, more preferably in an amount from 0.075 to 0.3 wt.-% and most preferably in an amount from 0.075 to 0.2 wt.-%, based on the total dry weight of the calcium carbonate containing material.

According to one embodiment of the present invention, the suspension obtained in step e) has a pH from 9 to 10 and preferably around 9.4.

According to another embodiment of the present invention, the suspension obtained in step e) has a Brookfield viscosity from 10 to 4900 mPa·s at 23° C., preferably from 40 to 3000 mPa·s at 23° C., more preferably from 70 to 1000 mPa·s at 23° C. and most preferably from 100 to 800 mPa·s at 23° C.

According to yet another embodiment of the present invention, grinding step f) is carried out after step e).

According to one embodiment of the present invention, grinding step f) is carried out at a temperature from 10° C. to 110° C., preferably from 20° C. to 90° C. and most preferably from 20° C. to 70° C.

According to another embodiment of the present invention, grinding step f) is carried out until the fraction of calcium carbonate containing material having a particle size of less than 2 μm is from 50 to 98 wt.-%, preferably from 60 to 98 wt.-%, more preferably from 70 to 98 wt.-%, and most preferably from 75 to 98 wt.-%, based on the total weight of the calcium carbonate containing material.

According to yet another embodiment of the present invention, the suspension obtained in step f) has a Brookfield viscosity in the range of 1 to 5000 mPas at 23° C., preferably in the range of 10 to 4000 mPas at 23° C., more preferably in the range of 20 to 3000 mPas at 23° C. and most preferably in the range of 30 to 1000 mPas at 23° C.

According to one embodiment of the present invention, the method further comprises step g) of concentrating the obtained suspension comprising calcium carbonate containing material such that the solids content in the suspension is at least 60 wt.-%, preferably from 60 wt.-% to 88 wt.-%, more preferably from 65 wt.-% to 86 wt.-%, even more preferably from 70 wt.-% to 84 wt.-% and most preferably from 75 wt.-% to 82 wt.-%, based on the total weight of the suspension.

According to another embodiment of the present invention, concentration step g) is carried out after step f).

According to yet another embodiment of the present invention, the method further comprises step h) of contacting the suspension comprising calcium carbonate containing material obtained in step f) and/or step g) with sodium silicate and/or sodium hydroxide.

According to one embodiment of the present invention, the contacting of step h) is carried out in that sodium silicate and/or sodium hydroxide is added in an amount greater than 0.001 wt.-%, preferably from 0.01 to 10 wt.-%, more preferably from 0.05 to 5 wt.-% and most preferably 0.1 to 4 wt.-%, based on the total dry weight of the calcium carbonate containing material.

As set out above, the inventive method for preparing an aqueous calcium carbonate containing suspension comprises the steps a), b), c), d), e) and f). In the following, it is referred to further details of the present invention and especially the foregoing steps of the inventive method for preparing an aqueous calcium carbonate containing suspension.

Step a): Provision of a Calcium Carbonate Containing Material

According to step a) of the inventive method for preparing an aqueous calcium carbonate containing suspension, a calcium carbonate containing material in the form of an aqueous cake or suspension having solids content of at least 45 wt.-%, based on the total weight of the aqueous cake or suspension, is provided.

According to one embodiment of the present invention, the calcium carbonate containing material is a ground calcium carbonate, a precipitated calcium carbonate, a modified calcium carbonate or a mixture thereof.

"Ground calcium carbonate" (GCC) in the meaning of the present invention is a calcium carbonate obtained from natural sources, such as limestone, marble, calcite, chalk or dolomite, and processed through a wet and/or dry treatment such as grinding, screening and/or fractionating, for example by a cyclone or classifier.

A ground calcium carbonate (GCC) may feature, e.g. one or more of marble, limestone, chalk, and/or dolomite. According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate containing material comprises a wet ground calcium carbonate containing material, the grinding step may be performed under conditions such that autogenous grinding takes place and/or by horizontal ball milling, and/or other such processes known to the skilled man. The wet processed ground calcium carbonate containing material thus obtained may be washed and dewatered by well known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be vaterite, calcite or aragonite.

A precipitated calcium carbonate (PCC) may feature, e.g. one or more of aragonitic, vateritic and/or calcitic mineralogical crystal forms. Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

"Modified calcium carbonate" (MCC) in the meaning of the present invention may feature a natural ground or precipitated calcium carbonate with an internal structure modification or a surface-reaction product. According to a preferred embodiment of the present invention, the modified calcium carbonate is a surface-reacted calcium carbonate. Such modified calcium carbonate is e.g. known from WO 2000/039222 A1.

It is preferred that the at least one calcium carbonate containing material comprises ground calcium carbonate (GCC).

In one preferred embodiment of the present invention, the calcium carbonate containing material comprises a mixture of ground calcium carbonate and a precipitated calcium carbonate or a modified calcium carbonate.

In addition to calcium carbonate, the calcium carbonate containing material may comprise further metal oxides such as titanium dioxide and/or aluminium trioxide, metal hydroxides such as aluminium tri-hydroxide, metal salts such as sulfates, silicates such as talc and/or kaolin clay and/or mica, carbonates such as magnesium carbonate and/or gypsum, satin white and mixtures thereof.

According to one embodiment of the present invention, the amount of calcium carbonate in the calcium carbonate containing material is at least 80 wt.-%, e.g. at least 95 wt.-%, preferably from 97 to 100 wt.-%, more preferably from 98.5 to 99.95 wt.-%, based on the total dry weight of the calcium carbonate containing material.

It is a specific requirement of the present invention that the cake or suspension has solids content of at least 45 wt.-%, based on the total weight of the aqueous cake or suspension.

According to one embodiment of the present invention, the cake or suspension has solids content of from 50 to 98 wt.-%, preferably from 60 to 90 wt.-% and more preferably from 70 to 85 wt.-%, based on the total weight of the aqueous cake or suspension.

In the case of an aqueous suspension, the solids content, as measured according to the method provided in the Examples section herebelow, may range from 50 to 98 wt.-%, but preferably is from 50 and 98 wt.-% or from 60 to 90 wt.-% and more preferably lies from 70 to 85 wt.-%, based on the total weight of the suspension.

In the case of a cake, the solids content is generally from 50 to 98 wt.-%, is preferably from 60 to 90 wt.-%, and even is more preferably from 70 to 85 wt.-%, based on the total weight of the cake.

Said suspension may be formed by suspending the calcium carbonate containing material provided in the form of a powder in water.

A cake is understood to refer to a cake formed on a filter medium following filtration, following centrifugation, or following sedimentation and decantation of an aqueous suspension of at least one calcium carbonate containing material.

In a preferred embodiment, said suspension or cake has a pH of between 7 and 10, more preferably a pH from 7 to 9 and most preferably a pH from 8 to 9.

According to one embodiment of the present invention, the calcium carbonate containing material has a weight median particle size $d_{50}$ from 1 to 100 μm, preferably from 1 to 70 μm, more preferably from 1 to 50 μm, even more preferably from 1 to 25 μm and most preferably from 1 to 10 μm, as measured by Sedigraph 5120. For example, the calcium carbonate containing material has a weight median particle size $d_{50}$ from 2 to 9 μm or from 4 to 9 μm, as measured by Sedigraph 5120.

Throughout the present document, the "particle size" of a calcium carbonate containing material is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value, a Sedigraph 5120 device from the company Micromeritics, USA, can be used. The measurement is carried out in an aqueous solution of 0.1 wt.-% $Na_4P_2O_7$. The samples are dispersed using a high speed stirrer and supersonics.

Said aqueous suspension or cake of step a) preferably comprises less than 0.2 wt.-%, based on the total dry weight of calcium carbonate containing material, of a polyacrylate-based dispersant like a salt of a polyacrylate. In one preferred embodiment of the present invention, the aqueous suspension or cake of step a) is free of polyacrylate-based dispersants like a salt of a polyacrylate.

If the aqueous suspension or cake of step a) comprises a polyacrylate-based dispersant, the dispersing agent is preferably selected from the group consisting of an acrylic polymer, an acrylic and a vinylic copolymer and mixtures thereof. Dispersing agents such as acrylic polymers, acrylic and vinylic copolymers or mixtures thereof having multiple acidic sites can be partially or totally neutralised. In one preferred embodiment, the dispersing agent which may be used according to the present invention is partially or completely neutralized, preferably to a degree of 5% to 100%, more preferably to a degree of 25% to 100% and most preferably to a degree of 75% to 100% using a neutralizing agent containing ions of alkali metals and/or alkaline earth metals. In an especially preferred embodiment, the acidic sites of the dispersing agent are neutralized using a neutralizing agent containing only sodium. In another especially preferred embodiment, the acidic sites of the dispersing agent are neutralized using a neutralizing agent containing only potassium. In a further especially preferred embodiment, the acidic sites of the dispersing agent are neutralized using a neutralizing agent containing a mixture of sodium and potassium.

In another preferred embodiment, the acidic sites of the dispersing agent are partially or completely neutralized by ions of alkaline earth metals contained in the aqueous suspension of calcium carbonate, for example, by the in-situ reaction of the organic dispersing agent with particles in the suspension; i.e. the dispersing agent is added into said suspension in the form of the corresponding un-neutralized dispersing agent and partially or completely neutralized after its addition into the aqueous suspension of calcium carbonate. In this case, the acidic sites of the dispersing agent are partially or completely neutralized preferably to a degree of 5% to 100%, more preferably to a degree of 25% to 100% and most preferably to a degree of 75% to 100% by said ions of alkaline earth metals. In one preferred embodiment, the acidic sites of the dispersing agent are partially or completely neutralized by calcium ions and/or magnesium ions.

Such dispersing agent may preferably have a molecular weight between 1 000 g/mol and 100 000 g/mol, preferably between 2 000 g/mol and 40 000 g/mol, more preferably between 3 000 g/mol and 35 000 g/mol. In particular, if the acidic sites of the dispersing agent are partially or completely neutralized by a neutralizing agent containing ions of alkali metals, such dispersing agent may have preferably a molecular weight between 1 000 g/mol and 100 000 g/mol, more preferably between 2 000 g/mol and 40 000 g/mol and most preferably between 3 000 g/mol and 35 000 g/mol. In case the acidic sites of the dispersing agent are partially or completely neutralized by a neutralizing agent containing ions of alkaline earth metals, such dispersing agent may preferably have a molecular weight between 3 000 g/mol and 20 000 g/mol.

Step b): Provision of at Least One Alkali Metal Salt of a Phosphonic Acid

According to step b) of the method of the present invention, at least one alkali metal salt of a phosphonic acid is provided. Said at least one alkali metal salt of a phosphonic acid is provided in an amount from 0.01 to 5 wt.-%, based on the total dry weight of the calcium carbonate containing material.

In one preferred embodiment, the at least one alkali metal salt of a phosphonic acid is provided in an amount from 0.05 to 2.5 wt.-%, preferably in an amount from 0.05 to 1.5 wt.-%, more preferably in an amount from 0.05 to 1 wt.-% and most preferably in an amount from 0.1 to 1 wt.-%, based on the total dry weight of the calcium carbonate containing material.

Preferably, said at least one alkali metal salt of a phosphonic acid is provided in the form of an aqueous solution. It is preferred that the aqueous solution comprising the at least one alkali metal salt of a phosphonic acid has a pH from 10 to 14, more preferably from 10 to 13 and most preferably from 11 to 13.

If the at least one alkali metal salt of a phosphonic acid is provided in form of an aqueous solution, the aqueous solution comprises the at least one alkali metal salt of a phosphonic acid preferably in an amount from 10 to 80 wt.-%, preferably from 20 to 66 wt.-% and most preferably from 30 to 50 wt.-%, based on the total weight of the solution.

The alkali metal of the at least one alkali metal salt of a phosphonic acid comprises the group 1 elements of the periodic system. Accordingly, the alkali metal of the at least one alkali metal salt of a phosphonic acid may be generally selected from the group consisting of lithium, sodium, potassium, rubidium, caesium, francium and mixtures thereof.

In one preferred embodiment of the present invention, the alkali metal of the at least one alkali metal salt of a phosphonic acid is selected from the group consisting of sodium, potassium, lithium and mixtures thereof. For example, the alkali metal of the at least one alkali metal salt of a phosphonic acid of step b) is sodium. Alternatively, the alkali metal of the at least one alkali metal salt of a phosphonic acid of step b) is potassium.

The alkali metal salt of a phosphonic acid is preferably an alkali metal salt of a diphosphonic acid or an alkali metal salt of a triphosphonic acid. For example, the alkali metal salt of a phosphonic acid is preferably an alkali metal salt of a diphosphonic acid.

Preferably an alkali metal salt of a diphosphonic acid is an alkali metal salt of an alkyl diphosphonic acid such as an alkali metal salt of 1-hydroxyethane 1,1-diphosphonic acid (HEDP).

Other alkali metal salts of a diphosphonic acid that may be employed in the present invention include an alkali metal salt of methylene diphosphonic acid (MDP), an alkali metal salt of hydroxymethylene diphosphonic acid (HMDP), an alkali metal salt of hydroxycyclomethylene diphosphonic acid (HCMDP), or an alkali metal salt of 1-hydroxy-3-aminopropane-1,1-diphosphonic acid (APD).

It is preferred that the alkali metal salt of a phosphonic acid is an alkali metal salt of 1-hydroxyethane 1,1-diphosphonic acid (HEDP).

If the alkali metal salt of a phosphonic acid is an alkali metal salt of a triphosphonic acid, said alkali metal salt of a triphosphonic acid may be an alkali metal salt aminotri(methylenephosphonic acid) (ATMP).

It is also possible for said alkali metal salt of a phosphonic acid to include a higher number of phosphonic acid groups, such as diethylenetriaminepenta(methylenephosphonic acid) (DTPMP).

It is also possible for said alkali metal salt of a phosphonic acid to include further groups, such as carboxylic acid groups. An example of such an alkali metal salt of a phosphonic acid is phosphonosuccinic acid (PSA).

In one preferred embodiment of the present invention, the alkali metal salt of a diphosphonic acid is selected from tetrasodium (1-hydroxyethylidene)bisphosphonate ($Na_4HEDP$), trisodium (1-hydroxyethylidene)bisphosphonate ($Na_3HEDP$) and disodium (1-hydroxyethylidene)bisphosphonate ($Na_2HEDP$). Alternatively, the alkali metal salt of a diphosphonic acid is selected from tetrapotassium (1-hydroxyethylidene)bisphosphonate ($K_4HEDP$), tripotassium (1-hydroxyethylidene)bisphosphonate ($K_3HEDP$) and dipotassium (1-hydroxyethylidene)bisphosphonate ($K_2HEDP$).

For example, the alkali metal salt of a diphosphonic acid is selected from tetrasodium (1-hydroxyethylidene)bisphosphonate ($Na_4HEDP$) and tetrapotassium (1-hydroxyethylidene)bisphosphonate ($K_4HEDP$). Preferably, the alkali metal salt of a diphosphonic acid is tetrasodium (1-hydroxyethylidene)bisphosphonate ($Na_4HEDP$).

Step c): Provision of at Least One Phosphonic Acid

According to step c) of the method of the present invention, at least one phosphonic acid is provided. Said at least one phosphonic acid is provided in an amount from 0.001 to 0.5 wt.-%, based on the total dry weight of the calcium carbonate containing material.

In one preferred embodiment, the at least one phosphonic acid is provided in an amount from 0.01 to 0.5 wt.-%, preferably in an amount from 0.05 to 0.4 wt.-%, more preferably in an amount from 0.075 to 0.3 wt.-% and most preferably in an amount from 0.075 to 0.2 wt.-%, based on the total dry weight of the calcium carbonate containing material.

Preferably, said at least one phosphonic acid is provided in the form of an aqueous solution. It is preferred that the aqueous solution comprising the at least one phosphonic acid has a pH from 0 to 5, more preferably from 0.5 to 4.5 and most preferably from 1 to 4.

If the at least one phosphonic acid is provided in form of an aqueous solution, the aqueous solution comprises the at least one phosphonic acid preferably in an amount from 25 to 75 wt.-%, preferably from 35 to 65 wt.-% and most preferably from 45 to 60 wt.-%, based on the total weight of the solution.

The at least one phosphonic acid is preferably selected from a diphosphonic acid and a triphosphonic acid. For example, the at least one phosphonic acid is preferably a diphosphonic acid.

Preferably, the at least one diphosphonic acid is an alkyl diphosphonic acid such as 1-hydroxyethane 1,1-diphosphonic acid (HEDP).

Other diphosphonic acids that may be employed in the present invention include methylene diphosphonic acid (MDP), hydroxymethylene diphosphonic acid (HMDP), hydroxycyclomethylene diphosphonic acid (HCMDP), or 1-hydroxy-3-aminopropane-1,1-diphosphonic acid (APD).

If the at least one phosphonic acid is a triphosphonic acid, said a triphosphonic acid may be aminotri(methylenephosphonic acid) (ATMP).

It is also possible for said at least one phosphonic acid to include a higher number of phosphonic acid groups, such as diethylenetriaminepenta(methylenephosphonic acid) (DTPMP).

It is also possible for said at least one phosphonic acid to include further groups, such as carboxylic acid groups. An example of such an alkali metal salt of a phosphonic acid is phosphonosuccinic acid (PSA).

It is preferred that the at least one phosphonic acid is 1-hydroxyethane 1,1-diphosphonic acid (HEDP).

Step d): Contacting the Calcium Carbonate Containing Material with the at Least One Alkali Metal Salt of a Phosphonic Acid According to step d) of the method of the present invention, the calcium carbonate containing material of step a) is contacted with the at least one alkali metal salt of a phosphonic acid of step b). Said contacting is carried out such as to obtain a suspension having a pH from 10 to 14.

In one preferred embodiment of the present invention, the aqueous calcium carbonate containing suspension obtained in step d) has a pH from 9 to 12, preferably from 10 to 12 and more preferably around 11.

It is to be understood that the amount of the at least one alkali metal salt of a phosphonic acid of step b) according to the present invention is selected such that it is sufficient in the calcium carbonate containing material of step a), i.e. the calcium carbonate containing suspension obtained in step d) has a pH from 10 to 14.

In order to fall into said final suspension pH range of step d), the at least one alkali metal salt of a phosphonic acid of step b) is added to the calcium carbonate containing material of step a) in an amount from 0.01 to 5 wt.-%, based on the total dry weight of the calcium carbonate containing material.

For example, the at least one alkali metal salt of a phosphonic acid of step b) is added to the calcium carbonate containing material of step a) in an amount from 0.05 to 2.5 wt.-%, preferably from 0.05 to 1.5 wt.-%, more preferably in an amount from 0.05 to 1 wt.-% and most preferably in an amount from 0.1 to 1 wt.-%, based on the total dry weight of the calcium carbonate containing material.

In one preferred embodiment, the contacting of the calcium carbonate containing material of step a) with the at least one alkali metal salt of a phosphonic acid of step b) is carried out in that the weight ratio of calcium carbonate containing material and alkali metal salt of a phosphonic acid is from 600:1 to 20:1, more preferably from 400:1 to 50:1, even more preferably from 300:1 to 100:1 and most preferably from 250:1 to 150:1.

The calcium carbonate containing material of step a) can be mixed with the at least one alkali metal salt of a phosphonic acid of step b) in any appropriate form, e.g. in the form of an aqueous solution or a dry material. Preferably, the at least one alkali metal salt of a phosphonic acid of step b) is in form of an aqueous solution. In one preferred embodiment, the at least one alkali metal salt of a phosphonic acid of step b) is in form of an aqueous solution comprising the at least one alkali metal salt of a phosphonic acid in an amount from 10 to 80 wt.-%, preferably from 20 and 66 wt.-% and most preferably from 30 to 50 wt.-%, based on the total weight of the solution.

Additionally or alternatively, the solids content in the suspension obtained in step d) has solids content of from 50 to 88 wt.-%, preferably from 55 to 88 wt.-%, more preferably from 65 to 86 wt.-%, even more preferably from 68 to 84 wt.-% and most preferably from 72 to 82 wt.-%, based on the total weight of the aqueous suspension.

The solids content of the suspension can be adjusted by methods known to the skilled person. To adjust the solids content of a calcium carbonate containing suspension, the suspension may be partially or fully dewatered by a filtration, centrifugation or thermal separation process. For example, the suspension may be partially or fully dewatered by a filtration process such as nanofiltration or a thermal separation process such as an evaporation process. Alternatively, water may be added to the particulate material of the calcium carbonate containing suspension (e.g. resulting from filtration) until the desired solids content is obtained. Additionally or alternatively, a calcium carbonate containing suspension having an appropriate lower content of solid particles may be added to the particulate material of the aqueous calcium carbonate containing suspension until the desired solids content is obtained.

In one preferred embodiment of the present invention, the solids content of the suspension obtained in step d) is adjusted in that it is diluted with water to solids content of from 40 to 90 wt.-%, preferably from 50 to 80 wt.-% and more preferably from 60 to 75 wt.-%, based on the total weight of the suspension.

Preferably, the addition of the at least one alkali metal salt of a phosphonic acid of step b) and the dilution with water is carried out simultaneously. For example, the solids content of the suspension obtained in step d) is adjusted in that an aqueous solution of the at least one alkali metal salt of a phosphonic acid of step b) is added to the calcium carbonate containing material of step a).

The contacting of step d) is preferably performed under mixing.

In the method of the present invention, the calcium carbonate containing material of step a) can be mixed with the at least one alkali metal salt of a phosphonic acid of step b) by any conventional mixing means known to the skilled person.

The addition of the at least one alkali metal salt of a phosphonic acid of step b) to the calcium carbonate containing material of step a) is not critical as long as the pH of the obtained suspension is from 10 to 14. Accordingly, said addition of the at least one alkali metal salt of a phosphonic acid of step b) may be carried out at once or in several portions. If the addition of the at least one alkali metal salt of a phosphonic acid of step b) to the calcium carbonate containing material of step a) is carried out in several portions, the portions may comprise equal amounts of the at least one alkali metal salt of a phosphonic acid of step b). Alternatively, said portions may comprise unequal amounts of the at least one alkali metal salt of a phosphonic acid of step b).

Additionally or alternatively, if the addition of the at least one alkali metal salt of a phosphonic acid of step b) to the calcium carbonate containing material of step a) is carried out in several portions, the pH of the suspension is preferably allowed to stabilize after the addition of a portion before the next portion is added.

The aqueous calcium carbonate containing suspension obtained in step d) has a Brookfield viscosity from 50 to 5000 mPa·s at 23° C., preferably from 60 to 3000 mPa·s at 23° C., more preferably from 100 to 1000 mPa·s at 23° C. and most preferably from 150 to 900 mPa·s at 23° C.

According to the present invention the Brookfield viscosity is measured after 1 minute of stirring by the use of an RVT model Brookfield DVII+™ viscometer at a temperature of about 23° C., and a rotation speed of 100 rpm (revolutions per minute) with the appropriate disc spindle N° 1 to 5.

Step e): Contacting the Obtained Suspension with the at Least One Phosphonic Acid According to step e) of the method of the present invention, the suspension of step d) is contacted with the at least one phosphonic acid of step c). Said contacting is carried out such as to obtain a suspension having a pH from 8 to 10.

In one preferred embodiment of the present invention, the aqueous calcium carbonate containing suspension obtained in step e) has a pH from 9 to 10 and preferably around 9.4.

It is to be understood that the amount of the at least one phosphonic acid of step c) according to the present invention is selected such that it is sufficient in the calcium carbonate containing material provided after step d), i.e. the calcium carbonate containing suspension of step e) has a pH from 8 to 10.

In order to obtain the calcium carbonate containing suspension having a pH from 8 to 10 of step e), the at least one phosphonic acid of step c) is added to the suspension obtained in step d) in an amount from 0.001 to 0.5 wt.-%, based on the total dry weight of the calcium carbonate containing material.

For example, the at least one phosphonic acid of step c) is added to the suspension obtained in step d) in an amount from 0.01 to 0.5 wt.-%, preferably from 0.05 to 0.4 wt.-%, more preferably in an amount from 0.075 to 0.3 wt.-% and most preferably in an amount from 0.075 to 0.2 wt.-%, based on the total dry weight of the calcium carbonate containing material.

In one preferred embodiment, the contacting of the calcium carbonate containing suspension of step d) with the at least one phosphonic acid of step c) is carried out in that the weight ratio of calcium carbonate containing material in said suspension and phosphonic acid is from 5000:1 to 200:1, more preferably from 4000:1 to 400:1, even more preferably from 3000:1 to 500:1 and most preferably from 2000:1 to 750:1.

The calcium carbonate containing suspension obtained in step d) can be mixed with the at least one phosphonic acid of step c) in any appropriate form, e.g. in the form of an aqueous solution or a dry material. Preferably, the at least one phosphonic acid of step c) is in form of an aqueous solution. In one preferred embodiment, the at least one phosphonic acid of step c) is in form of an aqueous solution comprising the at least one phosphonic acid in an amount from 25 to 75 wt.-%, preferably from 35 to 65 wt.-% and most preferably from 45 to 60 wt.-%, based on the total weight of the solution.

Additionally or alternatively, the solids content of the suspension obtained in step e) preferably has solids content from 50 to 85 wt.-%, preferably from 55 to 60 wt.-%, more preferably from 65 to 80 wt.-%, even more preferably from 68 to 78 wt.-% and most preferably from 68 to 75 wt.-%, based on the total weight of the suspension.

The contacting of step e) is preferably performed under mixing.

In the method of the present invention, the calcium carbonate containing suspension obtained in step d) can be mixed with the at least one phosphonic acid of step c) by any conventional mixing means known to the skilled person.

The addition of the at least one phosphonic acid of step c) to the calcium carbonate containing suspension obtained in step d) is not critical as long as the pH of the obtained suspension is from 8 to 10. Accordingly, said addition may be carried out at once or in several portions. If the addition of the at least one phosphonic acid of step c) to the calcium carbonate containing suspension obtained in step d) is carried out in several portions, the portions may comprise equal amounts of the at least one phosphonic acid of step c). Alternatively, said portions may comprise unequal amounts of the at least one phosphonic acid of step c).

Additionally or alternatively, if the addition of the at least one phosphonic acid of step c) to the calcium carbonate containing suspension obtained in step d) is carried out in several portions, the pH of the suspension is preferably allowed to stabilize after the addition of a portion before the next portion is added.

The aqueous calcium carbonate containing suspension obtained in step e) has preferably a Brookfield viscosity from 10 to 4900 mPa·s at 23° C., preferably from 40 to 3000 mPa·s at 23° C., more preferably from 70 to 1000 mPa·s at 23° C. and most preferably from 100 to 800 mPa·s at 23° C.

According to the present invention the Brookfield viscosity is measured after 1 minute of stirring by the use of an RVT model Brookfield DVII+™ viscometer at a temperature of about 23° C., and a rotation speed of 100 rpm (revolutions per minute) with the appropriate disc spindle N° 1 to 5.

Step f): Optionally Grinding the Obtained Suspension

According to optional step f) of the method of the present invention, the suspension of step e) is ground.

The grinding step may be undertaken by all the techniques and grinders well known to the man skilled in the art for wet grinding. The grinding step may be carried out with any conventional grinding device, for example, under conditions such that refinement predominantly results from impacts with a secondary body, i.e. in one or more of: a ball mill, a rod mill, a vibrating mill, a centrifugal impact mill, a vertical bead mill, an attrition mill, or other such equipment known to the skilled person. The grinding step f) may be carried out in batch or continuously, preferably continuously.

In one preferred embodiment of the present invention, the calcium carbonate containing suspension of step e) is to be ground. Accordingly, it is preferred that grinding step f) is carried out after step e).

Preferably, the calcium carbonate containing suspension of step e) to be ground has a pH from 8 and 10, preferably from 9 to 10 and more preferably of around 9.4.

Additionally or alternatively, the calcium carbonate containing suspension obtained after grinding has a pH from 8 and 10 and preferably from 9 to 10.

In one preferred embodiment of the present invention, the grinding step f) is carried out at a temperature from 10° C. to 110° C., preferably from 20° C. to 90° C. and most preferably from 20° C. to 70° C.

In one preferred embodiment of the present invention, grinding step f) is carried out until the fraction of calcium carbonate containing material having a particle size of less than 2 µm is from 50 to 98 wt.-%, preferably from 60 to 98 wt.-%, more preferably from 70 to 98 wt.-%, and most preferably from 75 to 98 wt.-%, based on the total weight of the calcium carbonate containing material, as measured with a Sedigraph 5120.

Additionally or alternatively, grinding step f) is carried out until the fraction of calcium carbonate containing material having a particle size of less than 2 µm is greater than 50 wt.-%, preferably greater than 60 wt.-%, more preferably greater than 70 wt.-%, still more preferably greater than 75 wt.-% and most preferably about 80 wt.-%, based on the total weight of the calcium carbonate containing material, as measured with a Sedigraph 5120.

Additionally or alternatively, the calcium carbonate containing material in the suspension obtained in step f) of the method of the present invention may have a weight median particle diameter $d_{50}$, measured according to the sedimentation method, in the range of from 0.01 µm to 10 µm, preferably from 0.1 µm to 7 µm and most preferably from 0.1 µm to 5 µm, for example from 0.1 µm to 4 µm.

In one preferred embodiment of the present invention, the solids content of the obtained suspension in step f) is at least 20 wt.-%, preferably from 20 wt.-% to 90 wt.-%, more preferably from 30 wt.-% to 88 wt.-%, even more preferably from 40 wt.-% to 86 wt.-% and most preferably from 50 wt.-% to 84 wt.-%, based on the total weight of the suspension. For example, the solids content of the obtained suspension in step f) is from 65 wt.-% to 82 wt.-% or from 68 wt.-% to 80 wt.-%, based on the total weight of the suspension.

The aqueous calcium carbonate containing suspension obtained in step f) preferably has a Brookfield viscosity in the range of 1 to 5000 mPas at 23° C., preferably in the range of 10 to 4000 mPas at 23° C., more preferably in the range of 20 to 3000 mPas at 23° C. and most preferably in the range of 30 to 1000 mPas at 23° C.

According to the present invention the Brookfield viscosity is measured after 1 minute of stirring by the use of an RVT model Brookfield DVII+™ viscometer at a temperature of about 23° C., and a rotation speed of 100 rpm (revolutions per minute) with the appropriate disc spindle N° 1 to 5.

In one preferred embodiment of the present invention, the method further comprises step g) of concentrating the obtained calcium carbonate containing suspension.

In one preferred embodiment of the present invention, concentration step g) is carried out before or after step f).

For example, concentration step g) is carried out before step f). Alternatively, concentration step g) is carried out after step f). Preferably, concentration step g) is carried out after step f).

If step g) is implemented in the process of the present invention, the solids content in the obtained suspension is adjusted such that it is at least 60 wt.-%, preferably from 60 wt.-% to 88 wt.-%, more preferably from 65 wt.-% to 86 wt.-%, even more preferably from 70 wt.-% to 84 wt.-% and most preferably from 75 wt.-% to 82 wt.-%, based on the total weight of the suspension.

The solids content of the obtained suspension can be adjusted by concentrating methods known to the skilled person. The concentrating of the corresponding calcium carbonate containing suspension may be achieved by means of a thermal process, for example in an evaporator, or by means of a mechanical process, for example in a filter press and/or centrifuge.

In one preferred embodiment of the present invention, the method comprises step g) of concentrating the obtained calcium carbonate containing suspension such that the solids content in the obtained suspension is at least 60 wt.-%, more preferably at least 65 wt.-% and most preferably at least 70 wt.-%, based on the total weight of the suspension. For example, the method comprises step g) of concentrating the obtained calcium carbonate containing suspension such that the solids content in the obtained suspension is at least 75 wt.-%, e.g. from 75 to 82 wt.-%, based on the total weight of the suspension.

In one preferred embodiment of the present invention, the method comprises step g) of concentrating the obtained calcium carbonate containing suspension such that a dry product is obtained.

The term "dry product" is understood to refer to a calcium carbonate containing material having a total surface moisture content of less than 0.5 wt.-%, preferably less than 0.2 wt.-% and more preferably less than 0.1 wt.-%, based on the total weight of the calcium carbonate containing material.

If the inventive process further comprises step g) of concentrating the obtained calcium carbonate containing suspension such that a dry product or a suspension having a solids content of at least 60 wt.-%, based on the total weight of the calcium carbonate containing suspension, is obtained, the dry product or the suspension may be rediluted. If the dry product or the suspension is rediluted, the solids content in the obtained suspension is adjusted such that it is at least 1 wt.-%, preferably from 1 wt.-% to 88 wt.-%, more preferably from 5 wt.-% to 86 wt.-%, even more preferably from 10 wt.-% to 84 wt.-% and most preferably from 15 wt.-% to 82 wt.-%, based on the total weight of the suspension.

In one preferred embodiment of the present invention, the method further comprises step h) of contacting the suspension comprising calcium carbonate containing material obtained in step f) and/or step g) with sodium silicate and/or sodium hydroxide.

Preferably, the method further comprises step h) of contacting the suspension comprising calcium carbonate containing material obtained in step f) with sodium silicate and/or sodium hydroxide. Alternatively, the method further comprises step h) of contacting the suspension comprising calcium carbonate containing material obtained in step g) with sodium silicate and/or sodium hydroxide.

Preferably, the calcium carbonate containing suspension obtained in step g) is contacted with sodium silicate. Alternatively, the calcium carbonate containing suspension obtained in step g) is contacted with sodium hydroxide.

In one preferred embodiment of the present invention, the contacting of step h) is carried out in that sodium silicate and/or sodium hydroxide is added to the calcium carbonate containing suspension obtained in step f) and/or step g), preferably to the calcium carbonate containing suspension obtained in step g), in an amount greater than 0.001 wt.-%, preferably from 0.01 to 10 wt.-%, more preferably from 0.05 to 5 wt.-% and most preferably from 0.1 to 4 wt.-%, based on the total dry weight of the calcium carbonate containing material.

If method step h) is implemented in the inventive method, the obtained calcium carbonate containing suspension preferably has a pH of greater than 9.5. In one preferred embodiment of the present invention, the obtained calcium carbonate containing suspension has a pH from 9.5 to 14.

In view of the very good results of the method for preparing an aqueous calcium carbonate containing suspension as defined above, a further aspect of the present invention refers to a suspension comprising a calcium carbonate containing material which is obtainable by the method according to the present invention. Such suspension contains a high solids content of calcium carbonate material, and preferably is free of latex-based binder. Furthermore, such suspension features a rheology that is stable over time and preferably features a rheology that is stable over time in the presence of sodium silicate and/or sodium hydroxide. For example, the Brookfield viscosity of the calcium carbonate containing suspension obtained by the inventive method is below 2500 mPas at 23° C. measured 24 h after contacting the suspension with sodium silicate and/or sodium hydroxide. Preferably, the Brookfield viscosity of the calcium carbonate containing suspension obtained by the inventive method is below 2000 mPas at 23° C., more preferably below 1500 mPas at 23° C., and most preferably below 1000 mPas at 23° C. when measured 24 h after contacting the suspension with sodium silicate and/or sodium hydroxide.

According to another aspect of the present invention, a calcium carbonate containing material obtainable by drying the suspension is provided.

The obtained suspension or dry product may find applications in paper, paper coating, plastic and/or paint applications. It is preferred that the obtained suspension or dry product may find application in paper coating applications.

The obtained suspension may be furthermore used for stabilizing the rheology of a coating formulation for paper applications, wherein the coating formulation comprises sodium silicate and/or sodium hydroxide.

It is to be understood that the advantageous embodiments described above with respect to the inventive method for preparing an aqueous calcium carbonate containing suspension also can be used for preparing or defining the inventive suspension, calcium carbonate containing material and its uses. In other words, the preferred embodiments described above and any combinations of these embodiments can also be applied to the inventive suspension, calcium carbonate containing material and its uses.

The scope and interest of the invention will be better understood based on the following examples which are intended to illustrate certain embodiments of the invention and are non-limitative.

EXAMPLES

Methods and Materials

In the following, materials and measurement methods implemented in the examples are described.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

pH of an Aqueous Suspension or Solution

The pH of the aqueous suspension or solution was measured using a standard pH-meter at room temperature, approximately 22° C.

Particle Size Distribution (Mass % Particles with a Diameter<X) and Weight Median Diameter ($d_{50}$) of a Particulate Material Weight median grain diameter and grain diameter mass distribution of a particulate material were determined via the sedimentation method, i.e. an analysis of sedimentation behavior in a gravitational field. The measurement was made with a Sedigraph™ 5120.

The method and the instrument are known to the skilled person and are commonly used to determine grain sizes of fillers and pigments. The measurement was carried out in an aqueous solution of 0.1 wt.-% $Na_4P_2O_7$. The samples were dispersed using a high speed stirrer and ultrasonic.

Brookfield Viscosity

The Brookfield viscosity was measured after 1 minute of stirring by the use of a RVT model Brookfield DVII+™ viscometer at a temperature of about 23° C., and a rotation speed of 100 rpm (revolutions per minute) with the appropriate disc spindle from N° 1 to 5.

Materials

Hydrocarb 75 ME, in the form of a suspension having solids content of 78 wt.-%, based on the total weight of the suspension, is commercially available calcium carbonate from Omya. The calcium carbonate is dispersed with a salt of a polyacrylate.

Omyacarb 10 AV, in the form of a powder (98 wt.-% of solids content) was obtained from Omya. Omyacarb 10 AV has a weight median particle size $d_{50}$ value of 10 µm, a top cut $d_{98}$ of 50 µm and a $d_{21}$ value of 2 µm.

Omyacarb 2 AV, in the form of a powder (98 wt.-% of solids content) was obtained from Omya. Omyacarb 2 AV has a weight median particle size $d_{50}$ value of 2.6 µm, a top cut $d_{98}$ of 15 µm and a $d_{38}$ value of 2 µm.

$CaCO_3$ from Molde (Norway), herein referred to as $CaCO_3$ Molde, in the form of filter cake having solids content of 83 wt.-%, based on the total weight of the filter cake, was obtained from Omya. $CaCO_3$ Molde has a weight median particle size $d_{50}$ value of 7 µm, a top cut $d_{98}$ of 50 µm and a weight median particle size $d_{23}$ value of 2 µm.

$CaCO_3$ from Molde (Norway) slurry, herein referred to as $CaCO_3$ Molde SL, in the form of a suspension having solids content of 74 wt.-%, based on the total weight of the filter cake, was obtained from Omya. $CaCO_3$ Molde has a weight median particle size $d_{50}$ value of 7 µm, a top cut $d_{98}$ of 50 µm and a weight median particle size $d_{23}$ value of 2 µm. It was dispersed with 1000 ppm of a polyacrylate.

Sodium hydroxide (NaOH), in the form of granules, was obtained from Fluka.

1-Hydroxyethane-1,1-diphosphonic acid (HEDP), in the form of a 56% by dry weight aqueous solution, was obtained from Chemische Fabrik Budenheim.

Tetrasodium (1-hydroxyethylidene)biphosphonate ($Na_4HEDP$), in the form of a 32% by dry weight aqueous solution, was obtained from Thermophos.

Tetrapotassium (1-hydroxyethylidene)biphosphonate ($K_4HEDP$) was synthesized by adding 90 g of KOH to an aqueous solution of HEDP previously formed by adding 200 g of water to 108 g of the 60 weight % aqueous solution of HEDP under stirring. The obtained clear solution had a pH of 12 and a concentration of $K_4HEDP$ of 33.5 g/100 g of water.

Sodium silicate was obtained from PQ Corporation under the tradename Crystall 0075.

Example 1

Inventive Example

This example demonstrates the inventive method for the preparation of an aqueous calcium carbonate containing suspension.

5.42 kg of $CaCO_3$ Molde was diluted with water to solids content of 74 wt.-%, based on the total weight of the suspension. 0.6 wt.-% Na$_4$HEDP, based on the total dry weight of the calcium carbonate containing material, in the form of a 32 wt.-% aqueous solution, based on the total weight of the solution, and 83 g water were added to the diluted calcium carbonate containing suspension. The obtained calcium carbonate containing suspension was mixed by using a dissolver stirrer equipped with a saw disk stirring plate (100 mm) at 4000 rpm. The obtained calcium carbonate containing suspension had solids content of 72 wt.-%, based on the total weight of the suspension. After 30 minutes of mixing the Brookfield Viscosity at 100 rpm showed a value of 280 mPas and a pH of 11.1.

Then, the pH of the calcium carbonate containing suspension was adjusted to 9.4 by adding a 56 wt.-%, based on the total weight of the solution, aqueous solution of HEDP and stirring the suspension for another 10 minutes. The Brookfield Viscosity of the obtained suspension was 130 mPas at 100 rpm with a solid content of 72 wt.-%, based on the total weight of the suspension.

Subsequently, the obtained calcium carbonate containing suspension was ground until the calcium carbonate containing material had a weight median particle size $d_{75}$ value of 2 µm, i.e. for about 60 minutes. For grinding a Dynomill Multilab from W. Bachofen AG was used filled with 1070 g of melt fused grinding beads consisting of 68 wt.-% baddeleyit and 32 wt.-% amorphous silica, based on the total weight of grinding beads, (0.6-1.0 mm) at about room temperature. The grinding chamber had a total volume of 600 cm$^3$. The mill speed was set to 2 500 rpm and the flow was set to 500 cm$^3$ min$^{-1}$.

The suspension obtained after grinding was concentrated under thermal evaporation and stirring to a solids content of 77.1 wt.-%, based on the total weight of the suspension. The obtained suspension had a pH of 9.7 and a Brookfield Viscosity at 100 rpm of 160 mPas.

Example 2

This Example refers to the contacting of a calcium carbonate containing suspension prepared by the inventive method with sodium silicate compared to a prior art suspension in which the calcium carbonate is dispersed by a salt of polyacrylate.

Example 2a

Comparative Example

In this Example the contacting of a calcium carbonate containing suspension of the prior art with sodium silicate is demonstrated.

Hydrocarb 75 ME-78% was diluted with water to solids content of 68 wt.-%, based on the total weight of the suspension. 3 wt.-%, based on the total dry weight of calcium carbonate containing material, of sodium silicate were added under stirring. The Brookfield Viscosity of the obtained suspension at 100 rpm was measured and the sample stored in an air tight beaker at 40° C. for 4 hours. After 4 hours the sample was stirred for 2 minutes and the Brookfield Viscosity of the suspension at 100 rpm measured. The sample was further stored at 40° C. for another 20 hours in an air tight beaker. After a total time of 24 hours the sample was stirred for 2 minutes and the Brookfield Viscosity of the suspension at 100 rpm measured again.

The details regarding the Brookfield viscosity subsequently after the treatment of the suspension with sodium silicate, and after 4 h and 24 h, respectively, are summarized in Table 1.

Example 2b

Inventive Example

In this Example, the contacting of sodium silicate with a calcium carbonate containing suspension prepared in accordance with the inventive method is demonstrated.

The suspension obtained in Example 1 was diluted with water to solids content of 68 wt.-%, based on the total weight of the suspension. 3 wt.-%, based on the total dry weight of calcium carbonate containing material, of sodium silicate were added under stirring. The Brookfield Viscosity of the suspension at 100 rpm was measured and the sample stored in an air tight beaker at 40° C. for 4 hours. After 4 hours the sample was stirred for 2 minutes and the Brookfield Viscosity of the suspension at 100 rpm measured. The sample was further stored at 40° C. for another 20 hours in an air tight beaker. After a total time of 24 hours the sample was stirred for 2 minutes and the Brookfield Viscosity of the suspension at 100 rpm was measured again.

The details regarding the Brookfield viscosity subsequently after the treatment of the suspension with sodium silicate, and after 4 h and 24 h, respectively, are summarized in Table 1.

TABLE 1

| Time [h] | Comparative Example 2a Brookfield Viscosity [mPas] | Inventive Example 2b Brookfield Viscosity [mPas] |
|---|---|---|
| 0 | 110 | 150 |
| 4 | 440 | 250 |
| 24 | 3700 | 2020 |

The above Table 1 shows that the suspension prepared in accordance with the inventive method (Example 2b) does not only lead to a clearly reduced Brookfield viscosity after 4 hours after contacting the suspension with sodium silicate but also to a Brookfield viscosity that is reduced by more than 45% after 24 hours compared to the Brookfield viscosity measured for a calcium carbonate containing suspension of the prior art (Example 2a).

Example 3

This Example refers to the contacting of a calcium carbonate containing suspension prepared by the inventive method with sodium hydroxide compared to a prior art suspension in which the calcium carbonate is dispersed by a salt of polyacrylate.

Example 3a

Comparative Example

In this Example the contacting of a calcium carbonate containing suspension of the prior art with sodium hydroxide is demonstrated.

Hydrocarb 75 ME-78% was diluted with water to solids content of 68 wt.-%, based on the total weight of the suspension. 0.3 wt.-%, 0.6 wt.-% and 0.9 wt.-%, respectively, based on the total dry weight of calcium carbonate containing material, of a 1M sodium hydroxide solution were added under stirring. The Brookfield Viscosity of the obtained suspensions at 100 rpm was measured and the respective samples stored in an air tight beaker at 40° C. for 4 hours. After 4 hours the respective samples were stirred for 2 minutes and the Brookfield Viscosity of the respective suspensions at 100 rpm measured. The respective samples were further stored at 40° C. for another 20 hours in an air tight beaker. After a total time of 24 hours the respective samples were stirred for 2 minutes and the Brookfield Viscosity of the respective suspensions at 100 rpm measured again.

The details regarding the Brookfield viscosity subsequently after the treatment of the suspensions with sodium hydroxide, and after 4 h and 24 h, respectively, are summarized in Table 2.

Example 3b

Inventive Example

In this Example, the contacting of sodium hydroxide with a calcium carbonate containing suspension prepared in accordance with the inventive method is demonstrated.

The suspension obtained in Example 1 was diluted with water to solids content of 68 wt.-%, based on the total weight of the suspension. 0.3 wt.-%, 0.6 wt.-% and 0.9 wt.-%, respectively, based on the total dry weight of calcium carbonate containing material, of a 1M sodium hydroxide solution were added under stirring. The Brookfield Viscosity of the obtained suspensions at 100 rpm was measured and the respective samples stored in an air tight beaker at 40° C. for 4 hours. After 4 hours the respective samples were stirred for 2 minutes and the Brookfield Viscosity of the respective suspensions at 100 rpm measured. The respective samples were further stored at 40° C. for another 20 hours in an air tight beaker. After a total time of 24 hours the respective samples were stirred for 2 minutes and the Brookfield Viscosity of the respective suspensions at 100 rpm measured again.

The details regarding the Brookfield viscosity subsequently after the treatment of the suspensions with sodium hydroxide, and after 4 h and 24 h, respectively, are summarized in Table 2.

TABLE 2

| Time [h] | Comparative Example 3a Brookfield Viscosity [mPas] | | | Inventive Example 3b Brookfield Viscosity [mPas] | | |
|---|---|---|---|---|---|---|
| | 0.3 wt.-% | 0.6 wt.-% | 0.9 wt.-% | 0.3 wt.-% | 0.6 wt.-% | 0.9 wt.-% |
| 0 | 970 | 3800 | 6100 | 75 | 245 | 1100 |
| 4 | 1520 | 5600 | 9100 | 70 | 210 | 970 |
| 24 | 2260 | 9000 | 11500 | 70 | 240 | 1000 |

From Table 2 it can be gathered that the contacting of a calcium carbonate containing suspension of the prior art (Example 3a) with sodium hydroxide leads to a clear increase in Brookfield viscosity over time. More precisely, it can be seen that the Brookfield viscosity for the suspensions contacted with 0.3 wt.-% and 0.6 wt.-%, respectively, increases by more than 100% within 24 hours relative to the initial Brookfield viscosity measured directly after the contacting of the suspension with sodium hydroxide. With regard to the suspension contacted with 0.9 wt.-% of sodium hydroxide, it can be gathered that the Brookfield viscosity increases by more than 80% within 24 hours relative to the initial Brookfield viscosity measured directly after the contacting of the suspension with sodium hydroxide.

In contrast thereto, Table 2 also shows that the contacting of the calcium carbonate containing suspension prepared in accordance with the inventive method with sodium hydroxide (Example 3b) does not only lead to a clearly reduced initial Brookfield viscosity measured directly after the contacting of the suspension with sodium hydroxide but also to a Brookfield viscosity that is stable over time.

Example 4

This example refers to the preparation of an aqueous calcium carbonate containing suspension by using varying amounts of $K_4HEDP$ and HEDP.

2.5 kg of $CaCO_3$ Molde was diluted with 258 g of water. 0.2 wt.-%, 0.4 wt.-% and 0.6 wt.-%, respectively, of $K_4HEDP$, based on the total dry weight of the calcium carbonate containing material, in the form of a 42 wt.-% aqueous solution, based on the total weight of the solution, was added to the diluted calcium carbonate containing suspension Please complement. The obtained suspensions were mixed by using a dissolver stirrer equipped with a saw disk stirring plate (100 mm) at 4000 rpm. Each of the obtained suspensions had solids content of 75.3 wt.-%, based on the total weight of the suspension. After 30 minutes of mixing, the Brookfield Viscosity of the suspensions at 100 rpm showed a value of 247 mPas, 425 mPas, and 467 mPas and a pH of 10.7, 11.2 and 11.3, respectively.

Then, the pH of the suspension prepared by adding 0.6 wt.-% of $K_4HEDP$, based on the total dry weight of the calcium carbonate containing material, was adjusted to 9.4 by adding 0.15 wt.-% of HEDP, in the form of a 30 wt.-% aqueous solution, based on the total weight of the solution based on the total dry weight of the calcium carbonate containing material, and stirring the suspension for another 10 minutes. The Brookfield Viscosity of the obtained suspension was 110 mPas at 100 rpm with a solid content of 75.3 wt.-%, based on the total weight of the suspension.

Subsequently, this suspension was ground until the calcium carbonate containing material had a weight median particle size $d_{76}$ value of 2 μm. For grinding a Dynomill Multilab from W. Bachofen AG was used filled with 1070 g of melt fused grinding beads consisting of 68 wt.-% baddeleyit and 32 wt.-% amorphous silica, based on the total weight of grinding beads, (0.6-1.0 mm) at about room temperature. The grinding chamber had a total volume of 600 $cm^3$. The mill speed was set to 2 500 rpm and the flow was set to 500 $cm^3$ $min^{-1}$.

The suspension obtained after grinding had a pH of 9.6 and a Brookfield Viscosity at 100 rpm of 230 mPas.

The details regarding the calcium carbonate suspensions and $K_4HEDP$ and HEDP added as well as the pH, the solids content, the Brookfield viscosity of the corresponding suspensions are summarized in Table 3.

TABLE 3

| Process step | pH | s.c. [wt.-%] | Brookfield viscosity [mPas] | <2 μm [wt.-%] |
|---|---|---|---|---|
| $CaCO_3$* + 0.2 wt.-% $K_4HEDP$ | 10.7 | 75.3 | 247 | 23 |
| $CaCO_3$* + 0.4 wt.-% $K_4HEDP$ | 11.2 | 75.3 | 425 | — |
| $CaCO_3$* + 0.6 wt.-% $K_4HEDP$ | 11.3 | — | 467 | — |
| $CaCO_3$* + 0.6 wt.-% $K_4HEDP$ + 0.15 wt.-% HEDP | 9.4 | 75.3 | 110 | — |

TABLE 3-continued

| Process step | pH | s.c. [wt.-%] | Brookfield viscosity [mPas] | <2 μm [wt.-%] |
|---|---|---|---|---|
| After grinding 18 min | 9.6 | 74.9 | 230 | 76 |
| 7 days unstirred | — | — | 270 | — |
| 7 days stirred | 9.8 | 74.9 | 220 | — |

*$CaCO_3$ from Molde

From Table 3 it can be gathered that the increasing addition of $K_4HEDP$ leads to an increased Brookfield viscosity. However, it can be further gathered that the subsequent addition of HEDP leads to a clear decrease in Brookfield viscosity.

Example 5

This example refers to the preparation of an aqueous calcium carbonate containing suspension by using varying amounts of $Na_4HEDP$ and HEDP.

2.1 kg of $CaCO_3$ Molde was diluted with 225 g of water. 0.2 wt.-%, 0.4 wt.-% and 0.6 wt.-%, respectively, of $Na_4HEDP$, based on the total dry weight of the calcium carbonate containing material, in the form of a 20 wt.-% aqueous solution, based on the total weight of the solution, were added to the diluted calcium carbonate containing suspension. The obtained suspensions were mixed by using a dissolver stirrer equipped with a saw disk stirring plate (100 mm) at 4000 rpm. The obtained suspensions had solids content of 75.6 wt.-%, 75.1 wt.-% and 75.0 wt.-%, respectively, based on the total weight of the suspension. After 30 minutes of mixing, the Brookfield Viscosity of the suspensions at 100 rpm showed a value of 440 mPas, 670 mPas, and 690 mPas and a pH of 10.8, 11.1 and 11.2, respectively.

Then, the pH of the suspension prepared by adding 0.6 wt.-% of $Na_4HEDP$, based on the total dry weight of the calcium carbonate containing material, was adjusted to 9.4 by adding 0.15 wt.-% of HEDP, based on the total dry weight of the calcium carbonate containing material, in the form of a 28 wt.-% aqueous solution, based on the total weight of the solution, and stirring the suspension for another 10 minutes. The Brookfield Viscosity of the obtained suspension was 390 mPas at 100 rpm with solids content of 74.9 wt.-%, based on the total weight of the suspension.

Subsequently, this suspension was ground until the calcium carbonate containing material had a weight median particle size $d_{77}$ value of 2 μm. For grinding a Dynomill Multilab from W. Bachofen AG was used filled with 1070 g melt fused grinding beads consisting of 68 wt.-% baddeleyit and 32 wt.-% amorphous silica, based on the total weight of grinding beads, (0.6-1.0 mm) at about room temperature. The grinding chamber had a total volume of 600 cm$^3$. The mill speed was set to 2 500 rpm and the flow was set to 500 cm$^3$ min$^{-1}$.

The suspension obtained after grinding had a pH of 9.6 and a Brookfield Viscosity at 100 rpm of 180 mPas.

The suspension obtained after grinding was further concentrated by thermal evaporation and stirring to solids content of 77.9 wt.-%, based on the total weight of the suspension. The obtained suspension had a pH of 9.6 and a Brookfield Viscosity at 100 rpm of 180 mPas.

The details regarding the calcium carbonate suspensions and $Na_4HEDP$ and HEDP added as well as the pH, the solids content, the Brookfield viscosity of the corresponding suspensions are summarized in Table 4.

TABLE 4

| Process step | pH | s.c. [wt.-%] | Brookfield viscosity [mPas] | <2 μm [wt.-%] |
|---|---|---|---|---|
| $CaCO_3$* + 0.2 wt.-% $Na_4HEDP$ | 10.8 | 75.6 | 440 | 23 |
| $CaCO_3$* + 0.4 wt.-% $Na_4HEDP$ | 11.1 | 75.1 | 670 | — |
| $CaCO_3$* + 0.6 wt.-% $Na_4HEDP$ | 11.2 | 75.0 | 690 | — |
| $CaCO_3$* + 0.6 wt.-% $Na_4HEDP$ + 0.15 wt.-% HEDP | 9.4 | 74.9 | 390 | — |
| After grinding 26 min | 9.6 | 70.3 | 180 | 77 |
| After concentration | 9.6 | 77.9 | 180 | 77 |
| 7 days unstirred | — | — | 230 | — |
| 7 days stirred | 9.7 | 77.7 | 200 | — |

*$CaCO_3$ from Molde

From Table 4 it can be gathered that the potassium salt of HEDP seems to be slightly more efficient in dispersing the calcium carbonate containing material of the $CaCO_3$ from Molde. The Brookfield viscosity of the suspension contacted with the sodium salt of HEDP at solids content of 75 wt.-% is higher than the viscosity of the suspension contacted with the potassium salt of HEDP (cf. Example 4).

Example 6

This example refers to the preparation of an aqueous calcium carbonate containing suspension by using Omyacarb 10 AV in combination with $Na_4HEDP$ and HEDP.

889 g of water were placed in a 5 liter bucket and 60 g of $Na_4HEDP$ were added under stirring. To that solution 2.55 kg of Omyacarb 10 AV were added stepwise under stirring by using a dissolver stirrer equipped with a saw disk stirring plate (100 mm) at 4000 rpm. The obtained suspension had solids content of 72.2 wt.-%, based on the total weight of the suspension. After 30 minutes of mixing, the Brookfield Viscosity of the suspension at 100 rpm showed a value of 400 mPas, and a pH of 11.0.

Then, the pH of the suspension was adjusted to 9.4 by adding 0.15 wt.-% of HEDP, based on the total dry weight of the calcium carbonate containing material, in the form of a 28 wt.-% aqueous solution, based on the total weight of the solution, and stirring the suspension for another 10 minutes. The Brookfield Viscosity of the obtained suspension was 160 mPas at 100 rpm with a solid content of 72.2 wt.-%, based on the total weight of the suspension.

Subsequently, the suspension was ground until the calcium carbonate containing material had a weight median particle size $d_{76}$ value of 2 μm. For grinding a Dynomill Multilab from W. Bachofen AG was used filled with 1070 g melt fused grinding beads consisting of 68 wt.-% baddeleyit and 32 wt.-% amorphous silica, based on the total weight of grinding beads, (0.6-1.0 mm) at about room temperature. The grinding chamber had a total volume of 600 cm$^3$. The mill speed was set to 2 500 rpm and the flow was set to 500 cm$^3$ min$^{-1}$.

The suspension obtained after grinding had a pH of 9.7 and a Brookfield Viscosity at 100 rpm of 110 mPas.

The suspension obtained after grinding was further concentrated by thermal evaporation and stirring to solids content of 77.9 wt.-%, based on the total weight of the suspension. The obtained suspension had a pH of 9.6 and a Brookfield Viscosity at 100 rpm of 160 mPas.

The details regarding the calcium carbonate suspension and $Na_4HEDP$ and HEDP added as well as the pH, the solids content, the Brookfield viscosity of the corresponding suspensions are summarized in Table 5.

TABLE 5

| Process step | pH | s.c. [wt.-%] | Brookfield viscosity [mPas] | <2 μm [wt.-%] |
|---|---|---|---|---|
| Omyacarb 10 AV + Na$_4$HEDP | 11.0 | 72.2 | 400 | 14 |
| Omyacarb 10 AV + Na$_4$HEDP + 0.15 wt.-% HEDP | 9.4 | 72.2 | 160 | — |
| After grinding 25 min | 9.7 | 72.5 | 110 | 76 |
| After concentration | 9.6 | 77.9 | 160 | 76 |
| 7 days unstirred | 9.7 | — | 340 | — |
| 7 days stirred | 9.7 | 78.1 | 220 | — |

From Table 5 it can be gathered that the Brookfield viscosity is still stable after 7 days.

Example 7

This example refers to the preparation of an aqueous calcium carbonate containing suspension by using Omyacarb 2 AV in combination with Na$_4$HEDP and HEDP.

361 g of water were placed in a 5 liter bucket and 17 g of Na$_4$HEDP were added under stirring. To that solution 1.02 kg of Omyacarb 2 AV were added stepwise under stirring by using a dissolver stirrer equipped with a saw disk stirring plate (100 mm) at 4000 rpm. The obtained first suspension had solids content of 72.2 wt.-%, based on the total weight of the suspension. After 30 minutes of mixing, the Brookfield Viscosity of the first suspension at 100 rpm showed a value of 585 mPas, and a pH of 10.8.

Then, the pH of this suspension was adjusted to 9.4 by adding 0.15 wt.-% of HEDP, based on the total dry weight of the calcium carbonate containing material, in the form of a 28 wt.-% aqueous solution, based on the total weight of the solution, and stirring the suspension for another 10 minutes. The Brookfield Viscosity of the obtained first suspension was 380 mPas at 100 rpm with a solids content of 72.0 wt.-%, based on the total weight of the suspension.

Then, the suspension was ground until the calcium carbonate containing material had a weight median particle size d$_{50}$ value of 2 μm. For grinding a Dynomill Multilab from W. Bachofen AG was used filled with 1070 g melt fused grinding beads consisting of 68 wt.-% baddeleyit and 32 wt.-% amorphous silica, based on the total weight of grinding beads, (0.6-1.0 mm) at about room temperature. The grinding chamber had a total volume of 600 cm$^3$. The mill speed was set to 2 500 rpm and the flow was set to 500 cm$^3$ min$^{-1}$.

The suspension obtained after grinding had a pH of 9.7 and a Brookfield Viscosity at 100 rpm of 180 mPas.

The details regarding the grinding conditions are summarized in Table 6.

TABLE 6

| t [min] | T [° C.] | p [bar] | Comments |
|---|---|---|---|
| 0 | 22 | 0 | Start → cascade |
| 7:00 | 42 | 0.3-0.4 | First pass finished → circulation |
| 10:00 | 44 | 0.3-0.4 | Stop 2 μm <61% → Continue |
| 17:00 | 42 | 0.4-0.5 | Stop 2 μm <66% → Continue |
| 25:00 | 42 | 0.4-0.5 | End 2 μm <80% |

The suspension obtained after grinding was further concentrated by thermal evaporation and stirring to solids content of 77.7 wt.-%, based on the total weight of the suspension. The obtained suspension had a pH of 9.5 and a Brookfield Viscosity at 100 rpm of 440 mPas.

The details regarding the calcium carbonate suspension and Na$_4$HEDP and HEDP added as well as the pH, the solids content, the Brookfield viscosity of the corresponding first, second and combined suspensions are summarized in Table 7.

TABLE 7

| Process steps for the first suspension | pH | s.c. [wt.-%] | Brookfield viscosity [mPas] | <2 μm [wt.-%] |
|---|---|---|---|---|
| Omyacarb 2 AV + Na$_4$HEDP | 10.8 | 72.2 | 585 | 28 |
| Omyacarb 2 AV + Na$_4$HEDP + 0.15 wt.-% HEDP | 9.4 | 72.0 | 380 | — |
| After grinding 25 min | 9.7 | 72.3 | 180 | 80 |
| After concentration | 9.5 | 77.7 | 440 | 80 |

From Table 7 it can be gathered that the Brookfield viscosity is still stable after 7 days.

Example 8

Comparative Example

This example refers to the preparation of an aqueous calcium carbonate containing suspension by using Omyacarb 10 AV in combination with Na$_4$HEDP without the adjustment of the pH with HEDP.

798 g of water were placed in a 5 liter bucket and 31 g of Na$_4$HEDP were added under stirring. To that solution 2.17 kg of Omyacarb 10 AV were added stepwise under stirring by using a dissolver stirrer equipped with a saw disk stirring plate (100 mm) at 4000 rpm. The obtained suspension had solids content of 72.2 wt.-%, based on the total weight of the suspension. After 30 minutes of mixing, the Brookfield Viscosity of the suspension at 100 rpm showed a value of 150 mPas, and a pH of 10.6.

Subsequently, the suspension was ground until the calcium carbonate containing material had a weight median particle size d$_{74}$ value of 2 μm. For grinding a Dynomill Multilab from W. Bachofen AG was used filled with 1070 g melt fused grinding beads consisting of 68 wt.-% baddeleyit and 32 wt.-% amorphous silica, based on the total weight of grinding beads, (0.6-1.0 mm) at about room temperature. The grinding chamber had a total volume of 600 cm$^3$. The mill speed was set to 2 500 rpm and the flow was set to 500 cm$^3$ min$^{-1}$. The grinding had to be stopped as the slurry thickened in the mill and nearly caused complete blockage of the mill. As a consequence, it should be noted that such process is not applicable.

The suspension obtained after grinding had a pH of 10.2 and a Brookfield Viscosity at 100 rpm of 310 mPas.

The details regarding the grinding conditions are summarized in Table 8.

TABLE 8

| t [min] | T [° C.] | p [bar] | Comments |
|---|---|---|---|
| 0 | 24 | 0 | Start → cascade |
| 3:40 | 36 | 0.3 | First pass finished → circulation |
| 7:20 | 37 | 0.3-0.4 | — |
| 11:00 | 40 | 0.4-0.5 | — |
| 14:40 | 40 | 0.4-0.5 | — |
| 19:20 | 41 | 0.4-0.5 | Stop 2 μm <67% → Continue |
| 22:00 | 42 | 0.6-0.7 | End 2 μm <74% → thickening at mill outlet |

The suspension obtained after grinding was further concentrated by thermal evaporation and stirring to solids content of 77.0 wt.-%, based on the total weight of the suspension. The obtained suspension had a pH of 10.0 and a Brookfield Viscosity at 100 rpm of 1730 mPas.

The details regarding the calcium carbonate suspension and Na$_4$HEDP added as well as the pH, the solids content, the Brookfield viscosity of the corresponding suspensions are summarized in Table 9.

TABLE 9

| Process step | pH | s.c. [wt.-%] | Brookfield viscosity [mPas] | <2 μm [wt.-%] |
|---|---|---|---|---|
| Omyacarb 10 AV + Na$_4$HEDP | 10.6 | 72.2 | 150 | — |
| After grinding 25 min | 10.2 | 72.0 | 310 | 74 |
| After concentration | 10.0 | 77.0 | 1730 | 73 |

From Table 9 it can be gathered that the contacting of a suspension comprising a calcium carbonate containing material only with an alkali metal salt of HEDP (without the further addition of HEDP) leads to a clear increase in Brookfield viscosity. Furthermore, it should be noted that such a suspension is not suitable for use as a coating color formulation. In addition thereto, the results indicate the advantageous properties of the aqueous calcium carbonate containing suspension prepared by the inventive method.

Example 9

Inventive Example

This example illustrates the possibility of using a calcium carbonate containing material dispersed with polyacrylate as feed material according to step a) of the invention.

4.0 kg CaCO$_3$ Molde SL were stirred by using a dissolver stirrer equipped with a saw disk stirring plate (100 mm) at 4000 rpm. 83 g water were added under stirring. The obtained suspension had solids content of 72.3 wt.-%, based on the total weight of the suspension. 76.1 g Na$_4$HEDP in the form of a 32 wt.-% aqueous solution, based on the total weight of the solution, were added. After 30 minutes of mixing, the Brookfield Viscosity of the suspension at 100 rpm showed a value of 920 mPas, and a pH of 11.1.

Then, the pH of this suspension was adjusted to 9.4 by adding 0.15 wt.-% of HEDP, based on the total dry weight of the calcium carbonate containing material, in the form of a 56 wt.-% aqueous solution, based on the total weight of the solution, and stirring the suspension for another 10 minutes. The Brookfield Viscosity of the obtained first suspension was 160 mPas at 100 rpm with a solids content of 71.7 wt.-%, based on the total weight of the suspension.

Subsequently, the suspension was ground until the calcium carbonate containing material had a weight median particle size d$_{79}$ value of 2 μm. For grinding a Dynomill Multilab from W. Bachofen AG was used filled with 1070 g melt fused grinding beads consisting of 68 wt.-% baddeleyit and 32 wt.-% amorphous silica, based on the total weight of grinding beads, (0.6-1.0 mm) at about room temperature. The grinding chamber had a total volume of 600 cm$^3$. The mill speed was set to 2 500 rpm and the flow was set to 500 cm$^3$ min$^{-1}$. The grinding had to be stopped as the slurry thickened in the mill and nearly caused complete blockage of the mill. As a consequence, it should be noted that such process is not applicable.

The suspension obtained after grinding was further concentrated by thermal evaporation and stirring to solids content of 78.1 wt.-%, based on the total weight of the suspension. The obtained suspension had a pH of 9.7 and a Brookfield Viscosity at 100 rpm of 220 mPas.

The invention claimed is:

1. A method for preparing an aqueous calcium carbonate containing suspension, comprising the following steps of:
   a) providing a calcium carbonate containing material in the form of an aqueous cake or suspension having solids content of at least 45 wt.-%, based on the total weight of the aqueous cake or suspension;
   b) providing at least one alkali metal salt of a phosphonic acid in an amount from 0.01 to 5 wt.-%, based on the total dry weight of the calcium carbonate containing material;
   c) providing at least one phosphonic acid in an amount from 0.001 to 0.5 wt.-%, based on the total dry weight of the calcium carbonate containing material;
   d) contacting the calcium carbonate containing material of step a) with the at least one alkali metal salt of a phosphonic acid of step b) such as to obtain a suspension having a pH from 10 to 14;
   e) contacting the suspension of step d) with the at least one phosphonic acid of step c) such as to obtain a suspension having a pH from 8 to 10; and
   f) optionally grinding the suspension obtained in step e).

2. The method of claim 1, wherein the calcium carbonate containing material of step a) is a ground calcium carbonate, a precipitated calcium carbonate, a modified calcium carbonate or a mixture thereof.

3. The method of claim 1, wherein the cake or suspension of step a) has solids content from 50 to 98 wt.-%, based on the total weight of the aqueous cake or suspension.

4. The method according to 1, wherein the calcium carbonate containing material of step a) has a weight median particle size d$_{50}$ from 1 to 100 μm.

5. The method according to 1, wherein the calcium carbonate containing material of step a) has a weight median particle size d$_{50}$ from 1 to 10 pm.

6. The method according to claim 1, wherein the alkali metal of the at least one alkali metal salt of a phosphonic acid of step b) is selected from the group consisting of sodium, potassium, lithium and any mixture thereof.

7. The method according to claim 1, wherein the at least one alkali metal salt of a phosphonic acid of step b) is an alkali metal salt of a diphosphonic acid or an alkali metal salt of a triphosphonic acid.

8. The method according to 1, wherein the at least one alkali metal salt of a phosphonic acid of step b) is an alkali metal salt of a diphosphonic acid selected from the group consisting of 1-hydroxyethane 1,1-diphosphonic acid (HEDP), methylene diphosphonic acid (MDP), hydroxymethylene diphosphonic acid (HMDP), hydroxycyclomethylene diphosphonic acid (HCMDP) and 1-hydroxy-3-aminopropane-1,1-diphosphonic acid (APD).

9. The method according to claim 1, wherein the at least one alkali metal salt of a phosphonic acid of step b) is an alkali metal salt of 1-hydroxyethane 1,1-diphosphonic acid (HEDP).

10. The method according to claim 1, wherein the at least one alkali metal salt of a phosphonic acid of step b) is an alkali metal salt of a diphosphonic acid selected from group consisting of tetrasodium (1-hydroxyethylidene) bisphosphonate (Na4HEDP), trisodium (1-hydroxyethylidene) bisphosphonate (Na3HEDP), disodium (1-hydroxyethylidene) bisphosphonate (Na2HEDP), tetrapotassium (1-hydroxyethylidene) bisphosphonate (K4HEDP), tripotassium (1-hydroxyethylidene) bisphosphonate (K3HEDP) and dipotassium (1-hydroxyethylidene) bisphosphonate (K2HEDP).

11. The method according to claim 1, wherein the at least one alkali metal salt of a phosphonic acid of step b) is tetrasodium (1-hydroxyethylidene) bisphosphonate (Na4HEDP).

12. The method according to claim 1, wherein the at least one alkali metal salt of a phosphonic acid of step b) is in a form of an aqueous solution comprising the at least one alkali metal salt of a phosphonic acid in an amount from 10 to 80 wt.-%, based on the total weight of the solution.

13. The method according to claim 1, wherein the at least one alkali metal salt of a phosphonic acid of step b) is in a form of an aqueous solution comprising the at least one alkali metal salt of a phosphonic acid in an amount from 20 to 66 wt.-%, based on the total weight of the solution.

14. The method according to claim 1, wherein the at least one alkali metal salt of a phosphonic acid of step b) is in a form of an aqueous solution comprising the at least one alkali metal salt of a phosphonic acid in an amount from 30 to 50 wt.-%, based on the total weight of the solution.

15. The method according to claim 1, wherein the at least one phosphonic acid of step c) is a diphosphonic acid or a triphosphonic acid.

16. The method according to claim 1, wherein the at least one phosphonic acid of step c) is a diphosphonic acid selected from 1-hydroxyethane 1,1-diphosphonic acid (HEDP), methylene diphosphonic acid (MDP), hydroxymethylene diphosphonic acid (HMDP), hydroxy cyclomethylene diphosphonic acid (HCMDP) and 1-hydroxy-3-aminopropane- 1,1-diphosphonic acid (APD).

17. The method according to claim 1, wherein the at least one phosphonic acid of step c) is 1-hydroxyethane 1,1-diphosphonic acid (HEDP).

18. The method according to claim 1, wherein the at least one phosphonic acid of step c) is in form of an aqueous solution comprising the at least one phosphonic acid in an amount from 25 to 75 wt.-%, based on the total weight of the solution.

19. The method according to claim 1, wherein the at least one alkali metal salt of a phosphonic acid of step b) is a sodium salt of 1-hydroxyethane 1,1-diphosphonic acid ($Na_4$HEDP) and the at least one phosphonic acid of step c) is 1-hydroxyethane 1,1-diphosphonic acid (HEDP).

20. The method according to claim 1, wherein step d) is carried out in that the at least one alkali metal salt of a phosphonic acid of step b) is added to the calcium carbonate containing material of step a) in an amount from 0.05 to 2.5 wt.-%, based on the total dry weight of the calcium carbonate containing material.

21. The method according to claim 1, wherein the suspension obtained in step d) is diluted with water to solids content of from 40 to 90 wt.-%, based on the total weight of the suspension.

22. The method according to 1, wherein the suspension obtained in step d) has a Brookfield viscosity from 50 to 5000 mPa-s at 23° C.

23. The method according to claim 1, wherein step e) is carried out in that the at least one phosphonic acid of step c) is added to the suspension obtained in step d) in an amount from 0.01 to 0.5 wt.-%, based on the total dry weight of the calcium carbonate containing material.

24. The method according to claim 1, wherein the suspension obtained in step e) has a pH from 9 to 10.

25. The method according to claim 1, wherein the suspension obtained in step e) has a Brookfield viscosity from 10 to 4900 mPa-s at 23° C.

26. The method according to claim 1, wherein grinding step f) is carried out after step e).

27. The method according to claim 1, wherein grinding step f) is carried out at a temperature from 10° C. to 110° C.

28. The method according to claim 1, wherein grinding step f) is carried out at a temperature from 20° C. to 70° C.

29. The method according to claim 1, wherein grinding step f) is carried out until the fraction of calcium carbonate containing material having a particle size of less than 2 pm is from 50 to 98 wt.-%, based on the total weight of the calcium carbonate containing material.

30. The method according to claim 1, wherein grinding step f) is carried out until the fraction of calcium carbonate containing material having a particle size of less than 2 pm is from 75 to 98 wt.-%, based on the total weight of the calcium carbonate containing material.

31. The method according to claim 1, wherein the suspension obtained in step f) has a Brookfield viscosity in the range of 1 to 5000 mPas at 23° C.

32. The method according to claim 1, wherein the suspension obtained in step f) has a Brookfield viscosity in the range of 30 to 1000 mPas at 23° C.

33. The method according to claim 1, wherein the method further comprises step g) of concentrating the obtained suspension comprising calcium carbonate containing material such that the solids content in the suspension is at least 60 wt.-%, based on the total weight of the suspension.

34. The method according to claim 1, wherein the method further comprises step g) of concentrating the obtained suspension comprising calcium carbonate containing material such that the solids content in the suspension is from 65 wt.-% to 86 wt.-%, based on the total weight of the suspension.

35. The method according to claim 33, wherein concentration step g) is carried out after step f).

36. The method according to claim 1, wherein the method further comprises step h) of contacting the suspension comprising calcium carbonate containing material obtained in step f) and/or step g) with sodium silicate and/or sodium hydroxide.

37. The method according to claim 36, wherein the contacting of step h) is carried out in that sodium silicate and/or sodium hydroxide is added in an amount greater than 0.001 wt.-%, based on the total dry weight of the calcium carbonate containing material.

38. The method according to claim 36, wherein the contacting of step h) is carried out in that sodium silicate and/or sodium hydroxide is added in an amount from 0.01 wt.-% to 10 wt.-%, based on the total dry weight of the calcium carbonate containing material.

39. A suspension comprising the calcium carbonate containing material obtained by the method of claim 1.

40. A calcium carbonate containing material obtained by drying the suspension of claim 39.

41. Paper, paper coating, plastic and/or paint comprising the suspension of claim 39 or a calcium carbonate containing material dried therefrom.

42. A coating formulation for paper applications comprising the suspension of claim 39 for stabilizing the rheology of the coating formulation, wherein the coating formulation comprises sodium silicate and/or sodium hydroxide.

* * * * *